Figure 1:
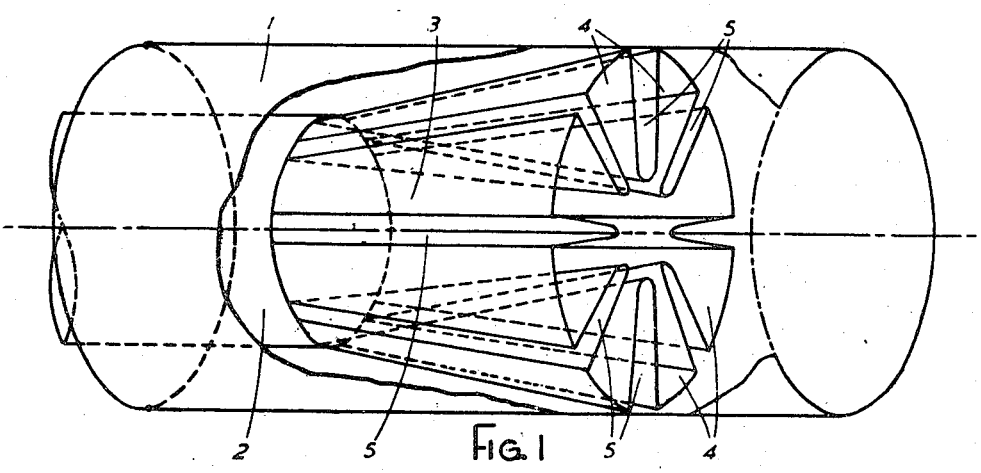

Sept. 2, 1947. P. LLOYD 2,426,833
APPARATUS FOR MIXING FLUIDS
Filed Oct. 17, 1944

Inventor
Peter Lloyd
By
Loyd Hall Sutton
Attorney

Patented Sept. 2, 1947

2,426,833

UNITED STATES PATENT OFFICE 2,426,833

APPARATUS FOR MIXING FLUIDS

Peter Lloyd, Camberley, England, assignor to Power Jets (Research and Development) Ltd., London, England, a British company Application October 17, 1944, Serial No. 559,046
In Great Britain November 5, 1943

9 Claims. (Cl. 259—4)

This invention relates to apparatus for mixing fluids, either gaseous or liquid, and more particularly to fluid mixing apparatus of the kind in which fluid streams flowing in parallel or in the same direction meet at the trailing or downstream edge of a boundary wall or interface separating the fluid streams.

In apparatus of this kind, it has been found that the fluid streams, particularly if they have considerable velocity, tend to continue beyond the edge of the boundary wall or interface as separate flows, and in consequence thorough and rapid intermixing of the fluids is difficult to attain.

The object of the present invention is to secure interpenetration or intermingling of the fluid streams, as they leave the boundary wall or interface, so as to ensure thorough and rapid mixing.

The basis of the invention is that the boundary wall or interface is adapted to divide or partially divide the fluid streams so that they flow in interleaved or interdigitated relation until they leave its trailing or downstream edge.

The division or partial division and the interleaving of the fluid streams is preferably produced progressively by extension and development of the boundary wall or interface toward the trailing or downstream edge from a plain section to a section of corrugated, sinuous, crenelated, serrated, or other re-entrant form transverse to the direction of flow. In this connection the change in the boundary wall from the plain to the re-entrant form, whilst being progressive, preferably is sufficiently abrupt to produce an appreciable transverse velocity component in the interleaved portions of the fluid streams so that they will impinge upon one another at an angle, while retaining generally the same direction of flow with reference to the conduit defining means within which the fluids flow.

Mixing of the fluid streams is considerably accelerated by causing them to meet in interdigitated relation, and the mixing is particularly rapid if an appreciable transverse velocity component is imparted to the interdigitated portions of the fluid streams.

Intermixing may be still further accelerated by introducing a small degree of turbulence into one or more of the fluid streams as they leave the trailing or downstream edge of the boundary wall or interface. This may be effected by providing means whereby a vortex trail is set up in one or more of the streams, and such means may comprise a small lip or beading on the downstream edge of the boundary wall and extending into the flow path of one or more of the fluid streams.

The invention will now be described with reference to and by the aid of the accompanying drawing, wherein:

Fig. 1 is a diagrammatic perspective view illustrating the application of the invention to a tubular form of mixer.

Figure 2:
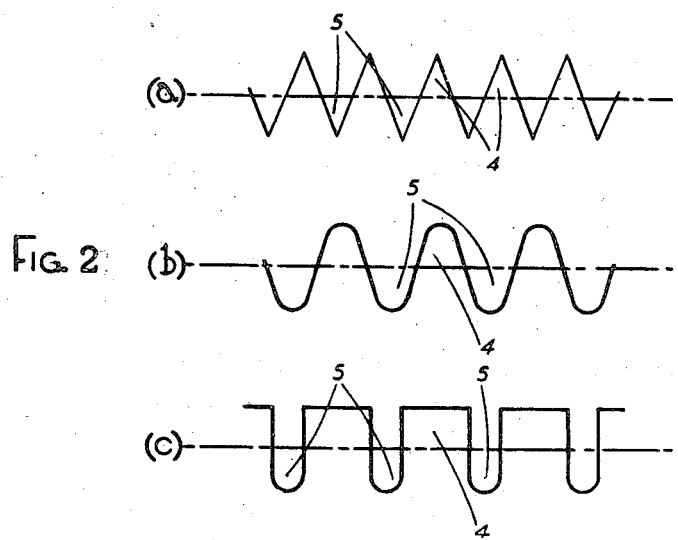

Figs. 2a, b and c are diagrammatic sectional views illustrating three alternative forms of development of the common boundary wall or interface.

Figure 3:
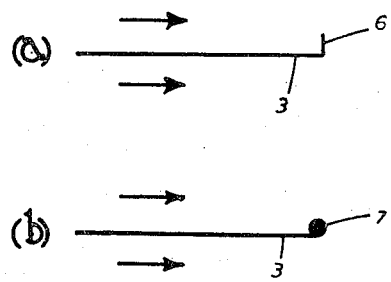

Figs. 3a and b are diagrammatic longitudinal sections of the common boundary wall or interface illustrating alternative means for introducing turbulence into one of the fluid streams.

Referring to Fig. 1 of the drawing, the mixer consists of two concentric tubes 1, 2 arranged one within the other, the outer tube 1 extending beyond the exit end of the inner tube 2 to afford a mixing chamber. The inner tube 2 which constitutes the boundary wall or interface separating the fluid streams, flowing in the same direction through the two tubes, is expanded at its exit end in the general form of a flare or truncated cone 3 which affords a progressive development from a plain circular cross section to a deeply corrugated star-like cross section. The re-entrant form developed in the flare or cone 3 provides for the fluids on opposite sides of the boundary wall passages, designated 4 and 5, which alternate interdigitally, so that the two fluid streams are each divided and caused to flow in interdigitated relation immediately before leaving the downstream edge of the boundary wall. This arrangement or construction secures interpenetration or intermingling of the fluid streams leaving the downstream edge of the boundary wall or interface and thereby ensures rapid mixing.

The progressive change in the boundary wall from the plain section to the deeply re-entrant form is sufficiently abrupt to produce an appreciable transverse velocity component in the interdigitated subdivisions of the fluid streams so that they will impinge upon one another at an angle, thereby considerably accelerating the interpenetration and mixing of the two fluids.

It will of course be understood that, whereas the invention has been described with reference to a mixer having concentric flow conduits for the fluids, it can equally well be applied to mixers of other forms, in which there is a boundary wall or interface separating the streams, by expanding and developing the boundary wall toward its downstream edge from a plain to a corrugated or other re-entrant form.

In any embodiment the construction may be such that the cross-sectional areas of the flow conduits for the respective fluids remain approximately constant throughout their length.

The boundary wall or interface may be developed from a plain cross section to any convenient re-entrant cross section. For example any of the re-entrant forms illustrated in Fig. 2 may be employed, that at (a) being a zig-zag or angular corrugation, that at (b) a deep corrugation with curved ridges, and that at (c) being a crenelated or castellated form.

In order to further accelerate the mixing, a lateral projection in the form of a small lip 6 (see Fig. 3a) or beading 7 (see Fig. 3b) may be provided on the downstream edge of the boundary wall so as to extend into the flow path of one of the fluid streams, thereby setting up a vortex trail or small degree of turbulence immediately beyond said downstream edge.

Fluid mixers embodying the present invention have many and various applications; for example they may be employed for mixing cold air with hot products of combustion in gas turbine engines or in flame dampers on engine exhausts, or they may be used for mixing air and fuel in carburettors or in industrial gas or oil burners.

What I claim as my invention and desire to secure by Letters Patent is:

1. Apparatus for mixing fluids, comprising cylinders defining concentric flow conduits with a common boundary wall separating fluid streams flowing in the same direction, a mixing chamber into which said conduits lead, and an extension and progressive development of the exit end of the common boundary wall from its plain circular cross-section to a deeply re-entrant star-like cross section which affords for the fluids on opposite sides of the common boundary wall passages which alternate so as to interdigitate the fluid streams immediately before leaving the downstream edge of the common boundary wall and while said fluids are flowing in the same general direction.

2. Apparatus for mixing fluids, comprising cylinders defining concentric flow conduits with a common boundary wall separating fluid streams flowing in the same direction, a mixing chamber into which said conduits lead, and an extension and progressive development of the exit end of the common boundary wall from its plain circular cross-section to a deeply re-entrant star-like cross section which affords for the fluids on opposite sides of the common boundary wall passages which alternate so as to interdigitate the fluid streams immediately before leaving the downstream edge of the common boundary wall and while said fluids are flowing in the same general direction, the change in the common boundary wall from the plain circular cross-section to the deeply re-entrant star-like cross-section being sufficiently abrupt to produce in the interdigitated portions of the fluid streams an appreciable transverse velocity component such as to ensure that they will impinge upon one another at an angle upon leaving the downstream edge of the common boundary wall.

3. Apparatus for mixing fluids, comprising cylinders defining concentric flow conduits with a common boundary wall separating fluid streams flowing in the same direction, a mixing chamber into which said conduits lead, and an extension and progressive development of the exit end of the common boundary wall from its plain circular cross-section to a deeply re-entrant star-like cross section which affords for the fluids on opposite sides of the common boundary wall passages which alternate so as to interdigitate the fluid streams immediately before leaving the downstream edge of the common boundary wall and while said fluids are flowing in the same general direction, the change in the common boundary wall from the plain circular cross-section to the deeply re-entrant star-like cross-section being such as to maintain the cross-sectional area of the flow conduits approximately constant and being sufficiently abrupt to produce an appreciable transverse velocity component in the interdigitated portions of the fluid streams so that they will impinge upon one another at an angle upon leaving the downstream edge of the common boundary wall.

4. Apparatus for mixing fluids, comprising cylinders defining concentric flow conduits with a common boundary wall separating fluid streams flowing in the same direction, a mixing chamber into which said conduits lead, and an extension and progressive development of the exit end of the common boundary wall from its plain circular cross-section to a deeply re-entrant star-like cross section which affords for the fluids on opposite sides of the common boundary wall passages which alternate so as to interdigitate the fluid streams immediately before leaving the downstream edge of the common boundary wall and while said fluids are flowing in the same general direction, the change in the common boundary wall from the plain circular cross-section to the deeply re-entrant star-like cross-section being such as to maintain the cross-sectional area of the flow conduits approximately constant and being sufficiently abrupt to produce an appreciable transverse velocity component in the interdigitated portions of the fluid streams so that they will impinge upon one another at an angle upon leaving the downstream edge of the common boundary wall, and a lateral projection on the downstream edge of the common boundary wall for setting up a vortex trail and thereby introducing a small degree of turbulence to accelerate intermixing of the fluid streams as they leave said downstream edge.

5. Apparatus for mixing fluids, comprising means defining conduits for fluid streams flowing in the same direction, a mixing chamber into which said conduits lead, and a boundary wall common to said conduits and separating the fluid streams until entry thereof into said mixing chamber, the cross-section of said boundary wall in the region immediately upstream of said mixing chamber changing progressively from a plain form to a re-entrant form so as to divide each of the fluid streams into a plurality of separated portions and to interdigitate the separated portions of one stream with those of the other while said streams are flowing in the same general direction toward, and before they enter, the mixing chamber, the progressive change in the common boundary wall from the plain to the re-entrant form being sufficiently abrupt to produce an appreciable transverse velocity component in the interdigitated portions of the fluid streams so that they will impinge upon one another at an angle upon leaving the downstream edge of the common boundary wall.

6. Apparatus for mixing fluids, comprising means defining conduits for fluid streams flowing in the same direction, a mixing chamber into which said conduits lead, and a boundary wall common to said conduits and separating the fluid streams until entry thereof into said mixing chamber, the cross-section of said boundary wall in the region immediately upstream of said mixing chamber changing progressively from a plain form to a re-entrant form so as to divide each of the fluid streams into a plurality of separated portions and to interdigitate the separated portions of one stream with those of the other while said streams are flowing in the same general direction toward, and before they enter, the mixing chamber, the progressive change in the common boundary wall from the plain to the re-entrant form being such as to maintain the cross-sectional areas of the flow conduits approximately constant, and being sufficiently abrupt to produce an appreciable transverse velocity component in the interdigitated portions of the fluid streams so that they will impinge upon one another at an angle upon leaving the downstream edge of the common boundary wall.

7. Apparatus for mixing fluids comprising means defining conduits for fluid streams flowing in the same direction, a mixing chamber into which said conduits lead, a boundary wall common to said conduits and separating the fluid streams until entry thereof into said mixing chamber, said wall dividing each of the fluid streams into a plurality of separated portions and interdigitating the separated portions of one stream with those of the other immediately before leaving the downstream edge of the common boundary wall and while said streams are flowing in the same general direction toward, and before they enter, the mixing chamber, and means for accelerating intermixing of the fluid streams by introducing a small degree of turbulence in the flow where they meet.

8. Apparatus for mixing fluids comprising means defining conduits for fluid streams flowing in the same direction, a mixing chamber into which said conduits lead, a boundary wall common to said conduits and separating the fluid streams until entry thereof into said mixing chamber, said wall dividing each of the fluid streams into a plurality of separated portions and interdigitating the separated portions of one stream with those of the other immediately before leaving the downstream edge of the common boundary wall and while said fluids are flowing in the same general direction toward and before they enter the mixing chamber, and a lateral projection on the downstream edge of the common boundary wall for setting up a vortex trail and thereby introducing a small degree of turbulence to accelerate intermixing of the fluid streams as they leave said downstream edge.

9. Apparatus for mixing fluids, comprising means defining conduits for fluid streams flowing in the same direction, a mixing chamber into which said conduits lead, said mixing chamber forming a common duct for the continued confined flow of the mixed streams beyond their entry to the mixing chamber, and a boundary wall common to said conduits and separating the fluid streams until entry thereof into said mixing chamber, the cross-section of said boundary wall in the region immediately upstream of said mixing chamber changing progressively from a plain form to a re-entrant form so as to divide each of the fluid streams into a plurality of separated portions and to interdigitate the separated portions of one stream with those of the other while said streams are flowing in the same general direction toward, and before they enter, the mixing chamber.

PETER LLOYD.

REFERENCES CITED

The following references are of record in the file of this patent:

UNITED STATES PATENTS

| Number | Name | Date |
| --- | --- | --- |
| 1,785,802 | Adams | Dec. 23, 1930 |
| 1,809,652 | Vincent | June 9, 1931 |
| 998,762 | Faller | July 25, 1911 |
| 1,581,223 | Moore | Apr. 20, 1926 |